United States Patent [19]

Morse

[11] Patent Number: 4,507,135
[45] Date of Patent: Mar. 26, 1985

[54] METHOD OF MAKING OPTICAL FIBER PREFORM

[75] Inventor: Theodore F. Morse, Providence, R.I.

[73] Assignee: Corning Glass Works, Corning, N.Y.

[21] Appl. No.: 404,425

[22] Filed: Aug. 2, 1982

[51] Int. Cl.³ .............................................. C03B 37/01
[52] U.S. Cl. ........................................ 65/3.12; 65/18.2
[58] Field of Search ................ 65/3.12, 13, 18.2, 144; 118/724; 427/53.1, 163; 219/121 LA, 121 LT

[56] References Cited

U.S. PATENT DOCUMENTS

| | | | |
|---|---|---|---|
| 3,873,339 | 3/1975 | Hudson | 427/53.1 |
| 3,957,474 | 5/1976 | Kobayashi et al. | 65/3.12 |
| 3,990,873 | 11/1976 | Knetzlstorfer | 65/13 X |
| 4,135,901 | 1/1979 | Fujiwara et al. | 65/3.12 X |
| 4,263,032 | 4/1981 | Sinclair et al. | 65/13 X |
| 4,302,230 | 11/1981 | MacChesney et al. | 65/3.12 |
| 4,310,340 | 1/1982 | Sarkar | 65/3.12 |
| 4,328,017 | 5/1982 | Buehl | 65/3.12 |
| 4,328,018 | 5/1982 | Siegfried | 65/3.12 |
| 4,331,462 | 5/1982 | Fleming, Jr. et al. | 65/3.12 |
| 4,378,985 | 4/1983 | Powers | 65/3.12 |

FOREIGN PATENT DOCUMENTS

| | | | |
|---|---|---|---|
| 2402270 | 7/1975 | Fed. Rep. of Germany | 65/3.12 |
| 2605483 | 8/1977 | Fed. Rep. of Germany | 65/3.12 |
| 67447 | 6/1978 | Japan | 65/3.12 |
| 134016 | 11/1978 | Japan | 65/3.12 |

Primary Examiner—William F. Smith
Assistant Examiner—Michael K. Boyer
Attorney, Agent, or Firm—W. J. Simmons, Jr.

[57] ABSTRACT

Various CVD processes are known whereby glass particles are flowed toward or over a substrate on which they are to be deposited. Because the substrate is cooler than the stream in which the particles are flowing, the thermophoretic force directs the particles toward the substrate. In accordance with the invention a beam of laser light is propagated over the surface in the vicinity of the stream of particles. The particles and/or a component within the stream absorbs the laser energy to induce within the stream of particles a temperature gradient whereby temperature increases with increased distance from the substrate surface.

2 Claims, 6 Drawing Figures

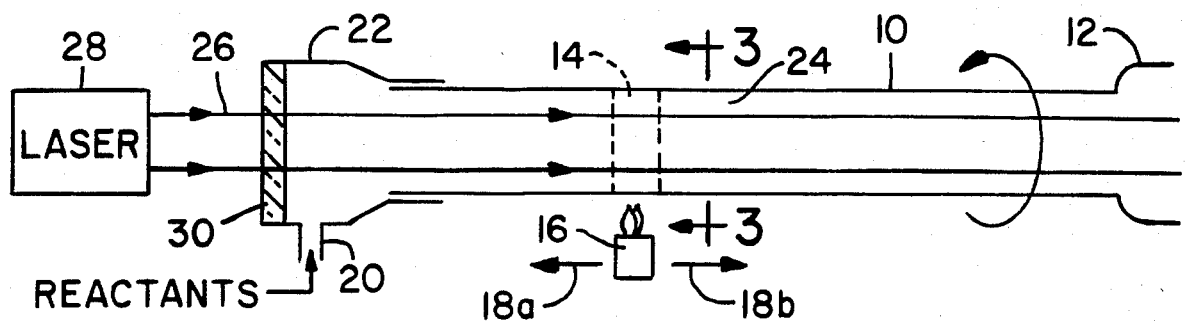
Fig. 1
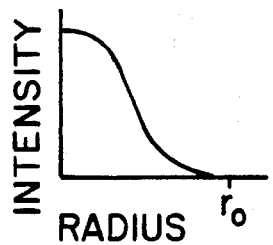
Fig. 2
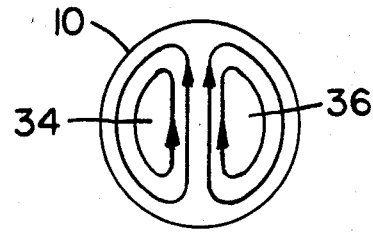
Fig. 3
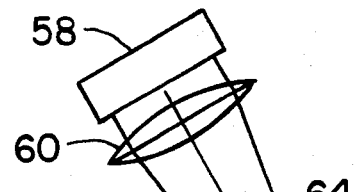
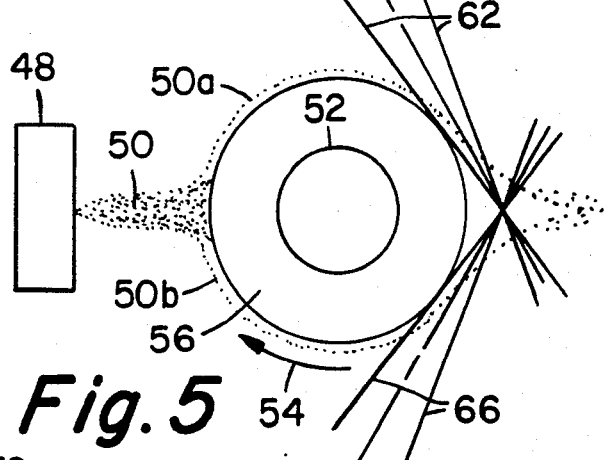
Fig. 5
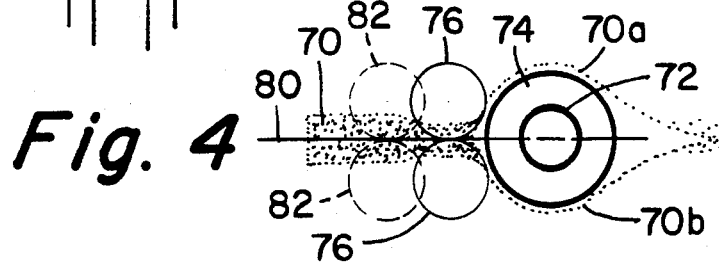
Fig. 4
Fig. 6

METHOD OF MAKING OPTICAL FIBER PREFORM

BACKGROUND OF THE INVENTION

The present invention relates to the manufacture of optical waveguide fiber preforms.

Optical waveguide fibers have been greatly improved during the last decade. Fibers exhibiting very low losses are generally formed by chemical vapor deposition (CVD) techniques which result in the formation of extremely pure materials. In accordance with these techniques, optical waveguide preforms can be formed by depositing glass layers on the outside surface of a temporary mandrel, or on the inside surface of a tube which later forms at least a portion of the cladding material, or by some combination of these techniques.

In accordance with one embodiment of the CVD technique, often referred to as the inside vapor deposition (IVD) process, the reactant vapors flow through a hollow, cylindrical substrate. The substrate and the contained vapor mixture are heated by a source that moves relative to the substrate in a longitudinal direction, whereby a moving hot zone is established within the substrate tube. A suspension of particulate material which is often called soot is produced within the hot zone. The soot travels downstream where at least a portion thereof comes to rest on the inner surface of the substrate where it is fused to form a continuous glassy deposit. Suitable layers are deposited to serve as the cladding, barrier layer and/or core material of the resultant optical waveguide fiber. The temperature of the glass tube is then increased to cause the tube to collapse. The resultant draw blank is then drawn in accordance with well known techniques to form an optical fiber having the desired diameter.

In another embodiment of the CVD process the vapor of reactant compounds is introduced into a suitable heat source such as a flame where it reacts to form a soot stream which is directed toward a mandrel. This so-called outside vapor deposition (OVD) method of forming coatings of glass soot is described in greater detail in U.S. Pat. Nos. Re 28,029; 3,823,995; 3,884,550; 3,957,474 and 4,135,901. After a plurality of coatings are formed on the mandrel, the mandrel is generally removed and the resultant tubular preform is gradually inserted into a consolidation furnace, the temperature of which is sufficiently high to fuse the particles of glass soot and thereby consolidate the soot preform into a dense glass body in which no particle boundaries exist. In one embodiment of the OVD process, which is described in U.S. Pat. No. 3,957,474, the starting rod forms the core of the resultant fiber. The deposited cladding soot is consolidated on the surface of the core rod. The resultant consolidated blank is drawn into an optical waveguide fiber. A modification of the OVD process referred to as axial vapor deposition is taught in U.S. Pat. Nos. 3,966,446, 4,017,288, 4,135,901, 4,224,046, and 4,231,774.

A hybrid technique whereby a core is formed by axial vapor phase oxidatin and a cladding layer is simultaneously deposited on the core by radially inwardly directed glass soot streams is taught in U.S. Pat. Nos. 3,957,474 and 4,062,665. As the core is formed, it is withdrawn from the burners or nozzles which formed it. The cladding is deposited by stationary burners or nozzles.

An important and probably limiting factor in determining the deposition rate in the aforementioned CVD processes is related to the temperature of the gas stream in which the soot particles are entrained. See the publication, P. G. Simpkins et al., "Thermophoresis: The Mass Transfer Mechanism in Modified Chemical Vapor Deposition", Journal of Applied Physics, Vol. 50, No. 9, September, 1979, pp. 5676–5681. Thermophoretic force drives the soot particles from the hotter parts of the gas stream toward the cooler parts. Because the preform surface is usually cooler than the surrounding gas stream, the action of thermophoresis tends to drive the soot particles toward the preform surface. When a surface is nearly as hot as the surrounding gas stream, the temperature gradient is low. Thus, the thermophoretic effect is minimal, and the deposition rate is low. However, when the surface temperature of the preform is low relative to that of the gas stream, the thermophoretic effect due to the large thermal gradient results in a relatively high deposition rate. Various techniques have been developed to increase deposition efficiency by increasing the thermal gradient between the gas stream and the substrate.

An embodiment which depends on an enhanced thermophoretic drive field produced by water-cooling the substrate tube is taught in U.S. Pat. No. 4,302,230. Enhancement of the thermophoritic field by disposing heaters within the substrate tube is taught in U.S. Pat. No. 4,263,032 and in U.S. patent application Ser. Nos. 161,011 and 161,012 now U.S. Pat. Nos. 4,328,017 and 4,328,018. U.S. Pat. No. 4,310,340 teaches the insertion of a flame-emitting tube into the substrate tube to enhance the thermophoresis effect. European patent application No. EP 0,038,982 A2 published Nov. 4, 1981 (MacChesney et al.) and equivalent to U.S. Pat. No. 4,331,462 teaches the use of an r.f. generated fireball to increase the thermal gradient within the substrate tube. Various of the above mentioned embodiments are disadvantageous in that they require the insertion of a heating apparatus into the substrate tube. The use of a plasma in the substrate tube is disadvantageous since the extremely high plasma temperatures can cause revolatilization of some of the soot particles, thereby causing the conversion of some of the $GeO_2$ to $GeO$ and oxygen.

U.S. patent application Ser. No. 270,235 now U.S. Pat. No. 4,378,985 teaches a method of improving the efficiency of the OVD process. Means such as a burner directs a stream of glass particulate material toward a lateral surface of a cylindrical core member to build up a coating thereon. The core member is provided with rotational movement and is provided with longitudinal movement in one direction with respect to the burner. Additionally, there is provided an oscillating movement of the burner with respect to a portion of the length of the core member. The oscillating motion of the burner relative to the core material permits the soot preform to cool down between successive burner passes, thus increasing deposition rate due to enhanced thermophoresis.

SUMMARY OF THE INVENTION

It is an object of the present invention to improve the deposition efficiency of methods of making optical waveguide preforms.

The present invention relates to the known method of forming a glassy layer on a surface by flowing a stream of a gas and glassy particulate matter toward or over the surface. The temperature of the stream is greater than that of the surface whereby particles are driven by thermophoretic force toward the surface and deposit thereon. The improvement of the present invention comprises propagating a beam of laser light adjacent to the surface in the vicinity of the stream. The intensity of that portion of the beam nearest the surface as determined in a direction perpendicular to the surface increases with increased distance from the surface. At least one component of this stream is absorptive of the laser light whereby a temperature gradient is induced within the stream which enhances the thermophoretic force, thereby increasing the efficiency of deposition of particles on the surface.

In accordance with one specific embodiment of the invention a vapor mixture flows through a hollow, cylindrical substrate. The substrate and contained vapor mixture are heated by a heat source that moves relative to the substrate in a longitudinal direction whereby a moving hot zone is established within the substrate. A suspension of particulate material is produced within the hot zone. At least a portion of the particulate material travels downstream where at least a portion thereof comes to rest on the inner surface of the substrate to form a deposit. There is propagated longitudinally through the substrate tube a beam of laser light, the intensity of which is greater near the center of the tube. The laser light is absorbed by at least one component of the stream, whereby a radial temperature gradient is induced within the tube.

In accordance with another embodiment of the invention a stream of particulate matter is directed toward the outer surface of a rotating, cylindrically shaped core member. A portion of the particulate matter deposits on the core member to form a preform. That particulate matter, which is not immediately deposited, divides into two streams that flow around the preform. A portion of the particulate matter in the two streams deposits on the preform and the remainder is exhausted. One or more laser beams may be caused to intersect the stream before it impinges on the preform to generate within the stream a thermal gradient that confines the stream to a narrower cross-section. This causes more of the particulate matter to immediately deposit on the preform. Alternatively, one or more laser beams can be caused to intersect the streams flowing around the preform to generate thermal gradients therein. The resultant thermophoretic force drives the particles in these streams toward the preform surface.

BRIEF DESCRIPTION OF THE DRAWING

FIG. 1 is a schematic representation of an apparatus suitable for practice of the deposition process in accordance with the present invention.

FIG. 2 is a graph showing the radial intensity distribution of the laser employed in FIG. 1, FIG. 3 is a cross-sectional view taken along lines 3—3 of FIG. 1, and corresponds to the streamline pattern in the absence of tube rotation.

FIG. 4 is a schematic representation illustrating a vertical orientation of the apparatus illustrated in FIG. 1.

FIGS. 5 and 6 are schematic representations of embodiments of the invention wherein a stream of particulate matter is directed toward a surface.

DESCRIPTION OF THE PREFERRED EMBODIMENT

FIG. 1 shows an IVD system comprising a substrate or bait tube 10 having exhaust tube 12 affixed to the downstream end thereof. Tubes 10 and 12 are chucked in a conventional glass turning lathe (not shown), and the combination is rotated as indicated by the arrow. A hot zone 14 is caused to traverse tube 10 by moving heating means 16 as schematically depicted by arrows 18a and 18b. The term "hot zone" is often used to refer to that portion of the bait tube which is sufficiently hot to cause it to glow, the temperature of that region usually being about 1100° C. or greater. The width of the hot zone depends upon such parameters as the size and speed of the burner. Heating means 16 can consist of any suitable source of heat such as a plurality of burners encircling tube 10, resistor ovens, rf susceptor ovens and the like. Since tube 10 is rotated, the temperature around the circumference is substantially uniform. Reactants are introduced into tube 10 via inlet pipe 20 of adaptor 22 which is connected to tube 10 by a rotary seal. Suitable means for delivering the reactants to pipe 20 are disclosed in U.S. Pat. Nos. 3,826,560, 4,148,621 and 4,173,305.

Burner 16 initially moves at a low rate of speed relative to tube 10 in the direction of arrow 18b, the same direction as the reactant flow. Glassy oxidic particulate material or soot, which produced in hot zone 14, is carried by moving gas to region 24 which is downstream from the hot zone. A portion of the soot particles impinges upon and adheres to the bait tube wall, thus causing a soot buildup in that portion of region 24 immediately downstream from the hot zone. The length of the buildup is generally about 1.5 to 2 times the diameter of the bait tube.

As pointed out in the aforementioned Simpkins et al. publication, the primary mechanism responsible for directing particulate material from the central region of tube 10 where it is formed to the tube wall upon which it deposits is the particulate material driving force associated with the thermal gradient which exists within tube 10. In accordance with the present invention this thermophoretic effect is enhanced by propagating a laser beam along the axis of tube 10. A $CO_2$ laser, which is suitable for this application, emits light having a wavelength of 10 $\mu$m. Laser 28 produces a beam 26 which is transmitted through a window 30 of suitable transparency that is located in the end of adapter 22. A sodium chloride window is suitable for transmitting the 10 $\mu$m beam. The beam preferably has a Gaussian intensity distribution as illustrated in FIG. 2 which shows the intensity decreasing to essentially zero at the tube radius $r_o$. This causes a radial temperature gradient to be generated in tube 10, the greatest temperature being at the tube axis.

In an oxide system in which silica is the predominant oxide, tube 10 may contain $O_2$, $Cl_2$, $GeCl_4$, $SiCl_4$, $SiO_2$ and $GeO_2$, for example. Only the oxides absorb energy at the 10 $\mu$m wavelength of the $CO_2$ laser. While the other vapors and gases are not radiatively heated by absorption, they become heated by the thermal coupling from the soot. The mass density of the soot is sufficiently large that the amount of heat transferred to the gas is sufficient to induce an enhanced thermophoretic effect.

Experiments have been conducted in which a laser beam of about 20–30 watts was directed axially along a horizontally disposed tube filled with $TiO_2$ soot. This $TiO_2$ soot can be formed without heating. Thus, temperature gradients are absent, and all observed effects are the result of laser interaction with the particulate matter. The steady-state flow pattern within the tube, which is illustrated in FIG. 3, comprises convection cells 34 and 36. The laser driven convection cells tend to drive the particles from the center region of the tube upwardly toward the tube wall where thermophoretic forces enhance the probability that the heated particles will deposit upon the cooler tube wall. The buoyancy-induced convective motion will dominate the radial thermophoretic motion in this case. Further, this cellular convective motion would be superimposed on the solid body rotation of the vapor in the tube when the tube rotates.

In a vertically oriented substrate tube such as that illustrated in FIG. 4 the thermophoretic force is again directed radially outwardly, but the buoyant, upwardly directed force is now along the axis of the substrate tube. For this reason it is preferred that the reactant flow represented by arrow 38 be directed downwardly, whereby the reactant flow rate in the center of tube 10' will not become too great.

As a model of the $SiO_2$ system, experiments were carried out in a closed, vertically-oriented tube containing an aerosol of $TiO_2$ soot suspended in air. The soot was subjected to an axial $CO_2$ laser beam, the power of which was about 20-30 watts. Following an initial buoyant flow along the axis in the region of laser heating, the axial region of the tube through which the beam passed became void of particulate matter. The laser beam had heated the particles which then heated the gas, and the void space along the tube axis was clearly the result of laser induced thermophoresis.

In the previously described embodiments wherein only the particles absorb laser radiation, there is no heating of the space within the laser beam after the particles move thermophoretically out of the beam. It may be desirable to heat the gas within the laser beam by adding to the gas an inert component that is capable of absorbing radiation at the desired laser wavelength. Sulfur hexofluoride, for example, absorbs strongly at carbon dioxide wavelengths, and yet, is quite stable. It is believed that small amounts of decomposition of sulfur hexofluoride would not be detrimental to optical fiber performance. If such a gas were employed, heating of the region within the laser beam would continue even after thermophoretic motion carried the absorbing particles out of the region of high laser intensity.

FIG. 5 illustrates the application of the method of the present invention to an OVD process. Flame hydrolysis burner 48 emits a flame (not shown) in which there is generated a soot stream 50 that is directed toward a mandrel or core member 52. As the mandrel rotates in the direction of arrow 54 and traverses back and forth along its axis, soot preform 56 builds up thereon. In conventional systems a portion of the soot in stream 50 immediately deposits on the preform, and the remainder thereof divides into streams 50a and 50b. A portion of the soot in streams 50a and 50b may deposit on the preform as these streams flow around the preform and are exhausted. In such conventional apparatus the amount of soot deposited on the preform is in the range of about 15 to 70% of that which is generated, depending upon the size of the preform.

To capture a portion of the soot in path 50a that normally would have been exhausted, a light beam from laser 58 is focused by a cylindrical lens system represented by lens 60 to a beam 62 which passes just above the surface of preform 56. As described hereinabove, the light intensity is greatest along the central plane of the beam which is represented by broken line 64. The intensity gradually decreases to essentially zero at the surface of the preform. This causes high thermal gradients to be generated close to the surface of the preform with the result that soot particles within the beam are subjected to a thermophoretic force directed toward the preform surface.

One or more additional laser beams such as focussed beam 66 may also be directed just above the surface of preform 56 at different circumferential regions as shown in FIG. 5.

As the radius of preform 56 increases, the apparatus generating the laser beams can be adjusted so that the intensity of the beam is essentially zero at the preform surface. The preform radius increases at a predetermined rate. Thus, any well known means such as a microprocessor-controlled apparatus could be employed to adjust the position of the beam relative to the preform surface.

FIG. 6 illustrates a further embodiment of the invention whereby a laser beam is caused to interact with a soot stream to increase deposition efficiency. Soot stream 70 is directed toward mandrel 72 to build up preform 74. It is those soot particles that are most remote from the center of stream 70 that tend to be diverted around the preform in streams 70a and 70b. In this embodiment one or more laser beams 76 are directed parallel to the axis of mandrel 72. These beams have an energy intensity distribution similar to that illustrated in FIG. 2 so that the intensity decreases to essentially zero at the circles which are indicative of the beam cross-section. As described hereinabove, the soot particles and/or a gaseous component in soot stream 70 absorbs laser energy to induce within the stream a temperature gradient which increases with increased distance from the center of stream 70. The resultant thermophoretic force causes particles in the outer region of stream 70 (as seen in FIG. 6) to be directed toward plane 80 which passes through the mandrel axis and through the central region of stream 70.

In the manner described above, beams 76 can be continually repositioned so that they intersect soot stream 70 as well as streams 70a and 70b. The laser beams could be positioned as indicated by dashed lines 82 so that they only intersect soot stream 70. Alternatively, a plurality of beams such as beams 76 and 82 could be located on each side of stream 70. While laser beams having a circular cross-section are illustrated in FIG. 6, beams of other cross-section could obviously be employed.

Of course, the above described embodiments are merely illustrative of the present invention. For example, in the illustrated embodiments the laser beam is propagated in the same direction as reactant flow. The laser beam could also be directed into the output end of the reactant tube, provided that the output end is suitably modified to contain an exhaust system through which the laser beam can enter. It will thus be apparent that numerous variations and modifications of the above-described methods and apparatus could be resorted to within the scope of the appended claims.

I claim:

1. In a method of manufacturing an optical fiber preform, comprising the steps of:

providing a cylindrical core member, and directing a stream of glass particles onto said core member to build up a preform thereon, a portion of said stream of particles flowing around said preform and being exhausted, the improvement which comprises:

directing a pair of laser beams through that portion of said stream which has not yet impinged upon said preform, the axes of said beams being parallel to the axis of said core member, the axes of said beams being disposed at opposite sides of said stream of particles, the combined effect of said laser beams inducing a temperature gradient within said portion of said stream to confine said stream, whereby some of the glass particles that would have been exhausted are driven by thermophoretic force onto the surface of said preform, the directions of said beams being such that the axes thereof do not intersect with said cylindrical core member nor with any deposit that forms thereon.

2. In a method of manufacturing an optical fiber preform, comprising the steps of:

providing a cylindrical core member, directing a stream of glass particles onto said core member to build up a preform thereon, a portion of said stream of particles flowing around said preform and being exhausted, the improvement which comprises:

directing a beam of laser light such that the outer region thereof, which is essentially zero intensity, is tangiential with the outer surface of said preform in the vicinity of a portion of said stream which flows around said preform, a portion of said laser beam thereby passing through said portion of said stream which flows around said preform, to induce a temperature gradient within said portion of said stream, whereby some of the glass particles that would have been exhausted are driven by thermophoretic force onto the surface of said preform, the direction of said beam being such that the axis thereof does not intersect with said cylindrical core member nor with any deposit that forms thereon.

* * * * *